United States Patent
Costanzo et al.

(10) Patent No.: US 7,229,715 B2
(45) Date of Patent: Jun. 12, 2007

(54) ANODE FOR BATTERY

(75) Inventors: James Costanzo, Danbury, CT (US); Lifun Lin, Lincoln, MA (US)

(73) Assignee: The Gillette Company, Boston, MA (US)

( * ) Notice: Subject to any disclaimer, the term of this patent is extended or adjusted under 35 U.S.C. 154(b) by 421 days.

(21) Appl. No.: 10/869,348

(22) Filed: Jun. 16, 2004

(65) Prior Publication Data

US 2004/0258995 A1  Dec. 23, 2004

Related U.S. Application Data (60) Provisional application No. 60/479,540, filed on Jun. 17, 2003.

(51) Int. Cl.
- *H01M 4/42* (2006.01)
- *H01M 6/00* (2006.01)
- *H01M 10/00* (2006.01)
- *C22C 1/04* (2006.01)

(52) U.S. Cl. ............... 429/229; 429/218.1; 419/23; 29/623.1

(58) Field of Classification Search ........... 429/229, 429/218.1; 419/23; 29/623.1
See application file for complete search history.

(56) References Cited

U.S. PATENT DOCUMENTS

| | | | |
|---|---|---|---|
| 3,661,645 A | 5/1972 | Strier et al. | |
| 3,784,506 A | 1/1974 | Vasta | |
| 3,884,722 A | 5/1975 | Tucholski | |
| 3,923,544 A | 12/1975 | Berchielli | |
| 3,953,242 A | 4/1976 | Hoffman | |
| 3,954,506 A | 5/1976 | Sullivan | |
| 4,104,188 A | 8/1978 | Nicaise | |
| 4,112,205 A | 9/1978 | Charkoudian et al. | |
| 4,144,382 A | 3/1979 | Takeda et al. | |
| 4,175,052 A | 11/1979 | Norteman, Jr. | |
| 4,195,120 A | 3/1980 | Rossler et al. | |
| 4,197,635 A | 4/1980 | Bilhorn | |
| 4,209,577 A | 6/1980 | Clash | |
| 4,242,424 A | 12/1980 | Buckler et al. | |
| 4,247,606 A | 1/1981 | Uetani et al. | |
| 4,260,669 A | 4/1981 | Kerg | |
| 4,288,913 A | 9/1981 | Parsen et al. | |
| 4,328,297 A | 5/1982 | Bilhorn | |
| 4,332,870 A | 6/1982 | Parsen et al. | |
| 4,361,633 A | 11/1982 | Nel et al. | |
| 4,372,823 A | 2/1983 | Church et al. | |

(Continued)

FOREIGN PATENT DOCUMENTS

CA  1263697  12/1989

(Continued)

OTHER PUBLICATIONS

Daniel-Ivad et al., "Mercury and lead free $Zn/MnO_2$ cells", Extended Abstracts, vol. 95-2, 1995, pp. 109-120.

(Continued)

*Primary Examiner*—Raymond Alejandro
*Assistant Examiner*—Angela J. Martin
(74) *Attorney, Agent, or Firm*—Fish & Richardson P.C.

(57) ABSTRACT

An anode includes zinc particles. At least about 30% by weight of the zinc particles are spherical.

17 Claims, 4 Drawing Sheets

U.S. PATENT DOCUMENTS

| | | | |
|---|---|---|---|
| 4,380,578 A | 4/1983 | Bahary | |
| 4,404,117 A | 9/1983 | Gugenberger | |
| 4,427,751 A | 1/1984 | Furukawa et al. | |
| 4,435,488 A | 3/1984 | Bahary et al. | |
| 4,455,358 A | 6/1984 | Graham et al. | |
| 4,460,543 A | 7/1984 | Glaeser | |
| 4,464,446 A | 8/1984 | Berger et al. | |
| 4,487,651 A | 12/1984 | Wang | |
| 4,500,614 A | 2/1985 | Nagamine et al. | |
| 4,514,473 A | 4/1985 | Atkin et al. | |
| 4,563,404 A | 1/1986 | Bahary | |
| 4,579,791 A | 4/1986 | Wang | |
| 4,585,716 A | 4/1986 | Chalilpoyil et al. | |
| 4,592,974 A | 6/1986 | Takeda et al. | |
| 4,604,335 A | 8/1986 | Johnson | |
| 4,606,869 A * | 8/1986 | Showak | 75/339 |
| 4,632,699 A | 12/1986 | Meeus et al. | |
| 4,649,093 A | 3/1987 | Vu et al. | |
| 4,681,698 A | 7/1987 | Graham et al. | |
| 4,722,763 A | 2/1988 | Pa et al. | |
| 4,735,876 A | 4/1988 | Miura et al. | |
| 4,743,185 A | 5/1988 | Vu et al. | |
| 4,777,100 A | 10/1988 | Chalilpoyil et al. | |
| 4,861,688 A | 8/1989 | Miura et al. | |
| 4,957,827 A | 9/1990 | Kordesch et al. | |
| 4,994,333 A | 2/1991 | Jose et al. | |
| 4,996,129 A | 2/1991 | Tuck | |
| 5,082,622 A | 1/1992 | Meeus et al. | |
| 5,108,494 A | 4/1992 | Uemura et al. | |
| 5,139,900 A | 8/1992 | Tada et al. | |
| 5,147,739 A | 9/1992 | Beard | |
| 5,162,169 A | 11/1992 | Tomantschger et al. | |
| 5,164,274 A | 11/1992 | Kordesch et al. | |
| 5,168,018 A | 12/1992 | Yoshizawa et al. | |
| 5,198,315 A | 3/1993 | Tada et al. | |
| 5,206,096 A | 4/1993 | Goldstein et al. | |
| 5,209,995 A | 5/1993 | Tada et al. | |
| 5,228,958 A | 7/1993 | Goldstein et al. | |
| 5,232,798 A | 8/1993 | Goldstein et al. | |
| 5,240,793 A | 8/1993 | Glaeser | |
| 5,278,005 A | 1/1994 | Yamauchi et al. | |
| 5,283,139 A | 2/1994 | Newman et al. | |
| 5,296,267 A | 3/1994 | Tada et al. | |
| 5,312,476 A | 5/1994 | Uemura et al. | |
| 5,340,666 A | 8/1994 | Tomantschger et al. | |
| 5,342,712 A | 8/1994 | Mieczkowska et al. | |
| 5,346,781 A | 9/1994 | Yuasa et al. | |
| 5,348,816 A | 9/1994 | Shinoda et al. | |
| 5,368,958 A | 11/1994 | Hirai et al. | |
| 5,376,480 A | 12/1994 | Shinoda et al. | |
| 5,389,468 A | 2/1995 | Fujiwara et al. | |
| 5,419,987 A | 5/1995 | Goldstein et al. | |
| 5,424,145 A | 6/1995 | Tomantschger et al. | |
| 5,425,798 A | 6/1995 | Sasaki et al. | |
| 5,432,031 A | 7/1995 | Teraoka et al. | |
| 5,434,023 A | 7/1995 | Teraoka et al. | |
| 5,445,908 A | 8/1995 | Inoue et al. | |
| 5,482,798 A | 1/1996 | Mototani et al. | |
| 5,514,496 A | 5/1996 | Mishima et al. | |
| 5,532,087 A | 7/1996 | Nerz et al. | |
| 5,541,021 A | 7/1996 | Watanabe et al. | |
| 5,587,254 A | 12/1996 | Kojima et al. | |
| 5,626,988 A | 5/1997 | Daniel-Ivad et al. | |
| 5,652,043 A | 7/1997 | Nitzan | |
| 5,712,060 A | 1/1998 | Grigorieva et al. | |
| 5,741,609 A | 4/1998 | Chen et al. | |
| 5,750,288 A | 5/1998 | Xie et al. | |
| 5,780,186 A | 7/1998 | Casey, Jr. | |
| 6,022,639 A | 2/2000 | Urry | |
| 6,284,410 B1 | 9/2001 | Durkot et al. | |
| 6,384,574 B1 | 5/2002 | McHugh et al. | |
| 6,472,103 B1 | 10/2002 | Durkot et al. | |
| 6,521,378 B2 | 2/2003 | Durkot et al. | |
| 2003/0087153 A1 | 5/2003 | Durkot et al. | |
| 2004/0131931 A1 | 7/2004 | Anglin et al. | |
| 2004/0131942 A1 | 7/2004 | Anglin et al. | |

FOREIGN PATENT DOCUMENTS

| | | | |
|---|---|---|---|
| DE | 23 45 514 A1 | | 9/1973 |
| DE | 2347273 | | 3/1974 |
| DE | 2441356 | | 3/1975 |
| DE | 3605718 A | | 8/1987 |
| EP | 0 162 411 | | 11/1985 |
| EP | 0 161 701 | | 4/1987 |
| EP | 0 328 131 A2 | | 8/1989 |
| EP | 0497074 A1 | | 5/1992 |
| EP | 0 377 106 B1 | | 1/1995 |
| EP | 0 762 521 A2 | | 12/1997 |
| EP | 0 817 294 A1 | | 7/1998 |
| FR | 2 276 699 | | 6/1974 |
| JP | 61058164 | * | 3/1886 |
| JP | 47-43896 | | 11/1968 |
| JP | 51 104533 | | 9/1976 |
| JP | 53-89811 A | | 8/1978 |
| JP | 55-66865 A | | 5/1980 |
| JP | 55-117869 | | 9/1980 |
| JP | 56-82571 A | | 7/1981 |
| JP | 56-145669 | | 11/1981 |
| JP | 57082972 | | 5/1982 |
| JP | 57-182972 | | 11/1982 |
| JP | 57188603 | | 11/1982 |
| JP | 58-026455 | | 2/1983 |
| JP | 58-155652 | | 9/1983 |
| JP | 58-158867 | | 9/1983 |
| JP | 58-217608 | | 12/1983 |
| JP | 58-218760 | | 12/1983 |
| JP | 58217608 | | 12/1983 |
| JP | 59-66061 | | 4/1984 |
| JP | 59-94371 | | 5/1984 |
| JP | 59078455 | | 5/1984 |
| JP | 59.121780 | | 7/1984 |
| JP | 59-167961 | | 9/1984 |
| JP | 60.32249 | | 2/1985 |
| JP | 60.146454 | | 2/1985 |
| JP | 60.146455 | | 2/1985 |
| JP | 60-048427 | | 3/1985 |
| JP | 60056365 | | 4/1985 |
| JP | 60-97581 | | 5/1985 |
| JP | 60.114548 | | 6/1985 |
| JP | 60146456 | | 8/1985 |
| JP | 60146457 | | 8/1985 |
| JP | 60175364 | | 9/1985 |
| JP | 60175368 | * | 9/1985 |
| JP | 60236462 | | 11/1985 |
| JP | 60262352 | | 12/1985 |
| JP | 60262353 | | 12/1985 |
| JP | 60262354 | | 12/1985 |
| JP | 61010861 | | 1/1986 |
| JP | 61019066 | | 1/1986 |
| JP | 61.58164 | | 3/1986 |
| JP | 61-58164 A | | 3/1986 |
| JP | 61049373 | | 3/1986 |
| JP | 61077264 | | 4/1986 |
| JP | 61078057 | | 4/1986 |
| JP | 61078067 | | 4/1986 |
| JP | 61079759 | | 4/1986 |
| JP | 61-131363 | | 6/1986 |
| JP | 61 133560 | | 6/1986 |
| JP | 61140066 | | 6/1986 |
| JP | 61140067 | | 6/1986 |
| JP | 61140068 | | 6/1986 |
| JP | 61140464 | | 6/1986 |
| JP | 61143939 | | 7/1986 |

| | | | |
|---|---|---|---|
| JP | 61153948 | | 7/1986 |
| JP | 61153953 | | 7/1986 |
| JP | 61-193362 | | 8/1986 |
| JP | 61-203564 | | 9/1986 |
| JP | 62-31951 | | 2/1987 |
| JP | 62-040162 | | 2/1987 |
| JP | 62-069463 | * | 3/1987 |
| JP | 62-69463 A | | 3/1987 |
| JP | 62105365 | | 5/1987 |
| JP | 62-123658 | | 6/1987 |
| JP | 62225164 | | 10/1987 |
| JP | 63-006747 | | 1/1988 |
| JP | 63195975 | | 8/1988 |
| JP | 1-124957 | | 5/1989 |
| JP | 01-124957 | * | 5/1989 |
| JP | 3033014 | | 2/1991 |
| JP | 30 071559 | | 3/1991 |
| JP | 3-272563 | | 12/1991 |
| JP | 5-101824 | | 4/1993 |
| JP | 7-105948 | | 4/1995 |
| JP | 60-91562 | | 5/1995 |
| JP | 9060803 | | 3/1997 |
| JP | 09-235636 | | 9/1997 |
| JP | 2000106189 | | 4/2000 |
| JP | 2001-229923 | | 8/2001 |
| JP | 2002146411 | | 5/2002 |
| RU | 498667 | | 1/1974 |
| RU | 399942 | | 2/1974 |
| RU | 586516 | | 12/1977 |
| RU | 641554 A | | 1/1979 |
| WO | WO 98/20569 | | 5/1998 |
| WO | WO00/48260 | | 8/2000 |
| WO | WO01/40529 | | 6/2001 |
| WO | WO02/002257 | | 10/2002 |

OTHER PUBLICATIONS

"Centrifugal Atomization Methods", ASM Handbook, vol. 7, "Power Metal Technologies and Applications", copyright 1998 by ASM International (1 page).

Dunkley, J., "Perfectly Formed—Anti-Satellite System for Spherical Powders", *Materials World*, Jul. 2002, p. 24-25.

Unal, A., "Gas Atomization of Fine Zinc Powders", American Powder Metallurgy Institute, vol. 26, No. 1, 1990, p. 11-21.

Huot et al., "Binary and Ternary Zinc Powder Mixtures for Alkaline Zinc Anodes", pp. 445-448 (available prior to filing of the application).

"Properties and Applications of Atomised Metal Powders", pp. 520-525 (available prior to filing of the application).

"Physical Properties of Zinc Powder", pp. 34-35 (available prior to filing of the application).

Yule at al., "Atomization of Melts", Clarendon Press, Oxford, England (1994), pp. 223-224.

* cited by examiner

ANODE FOR BATTERY

CROSS-REFERENCE TO RELATED APPLICATIONS

This application claims priority from U.S. Provisional Application Ser. No. 60/479,540, filed on Jun. 17, 2003, which is incorporated herein by reference in its entirety.

TECHNICAL FIELD

This invention relates to batteries.

BACKGROUND

Batteries, such as primary alkaline batteries, are commonly used electrical energy sources. Generally, a battery contains a negative electrode, typically called the anode, and a positive electrode, typically called the cathode. The anode contains an active material (e.g., zinc particles) that can be oxidized; and the cathode contains an active material (e.g., manganese dioxide) that can be reduced. The anode active material is capable of reducing the cathode active material. In order to prevent direct reaction of the anode material and the cathode material, the anode and the cathode are electrically isolated from each other by a separator.

When a battery is used as an electrical energy source in a device, such as a cellular telephone, electrical contact is made to the anode and the cathode, allowing electrons to flow through the device and permitting the respective oxidation and reduction reactions to occur to provide electrical power. An electrolyte in contact with the anode and the cathode contains ions that flow through the separator between the electrodes to maintain charge balance throughout the battery during discharge.

SUMMARY

The invention generally relates to batteries with anodes that include spherical zinc particles.

In one aspect, the invention features an anode including zinc particles. At least about 50% by weight of the zinc particles (e.g., at least about 60%, at least about 70%, at least about 80%, at least about 90%, or at least about 95% by weight of the zinc particles) are spherical. In some embodiments, the zinc particles are an alloy of zinc and aluminum, bismuth, calcium, gallium, indium, lithium, magnesium, lead, tin, or combinations thereof.

In another aspect, the invention features a battery with a housing and a cathode and anode within the housing. The anode includes the spherical zinc particles. In some embodiments, the battery is an alkaline battery. In certain embodiments, the battery is an AA battery, an AAA battery, a C battery, or a D battery.

In another aspect, the invention features a method of making zinc particles. The method includes centrifugally atomizing molten zinc in an atmosphere of less than about 1% oxygen (e.g., less than about 0.7%, less than about 0.5%, less than about 0.3%, less than about 0.1%, oxygen) to make the zinc particles. At least about 30% by weight of the zinc particles (e.g., at least about 50% by weight, at least about 70% by weight, of the zinc particles) are spherical. The method can further include incorporating the zinc particles into an anode. The battery can be made by incorporating the anode and a cathode into a cell housing.

Other features and advantages of the invention will be apparent from the description and drawings, and from the claims.

DETAILED DESCRIPTION

Figure 1:
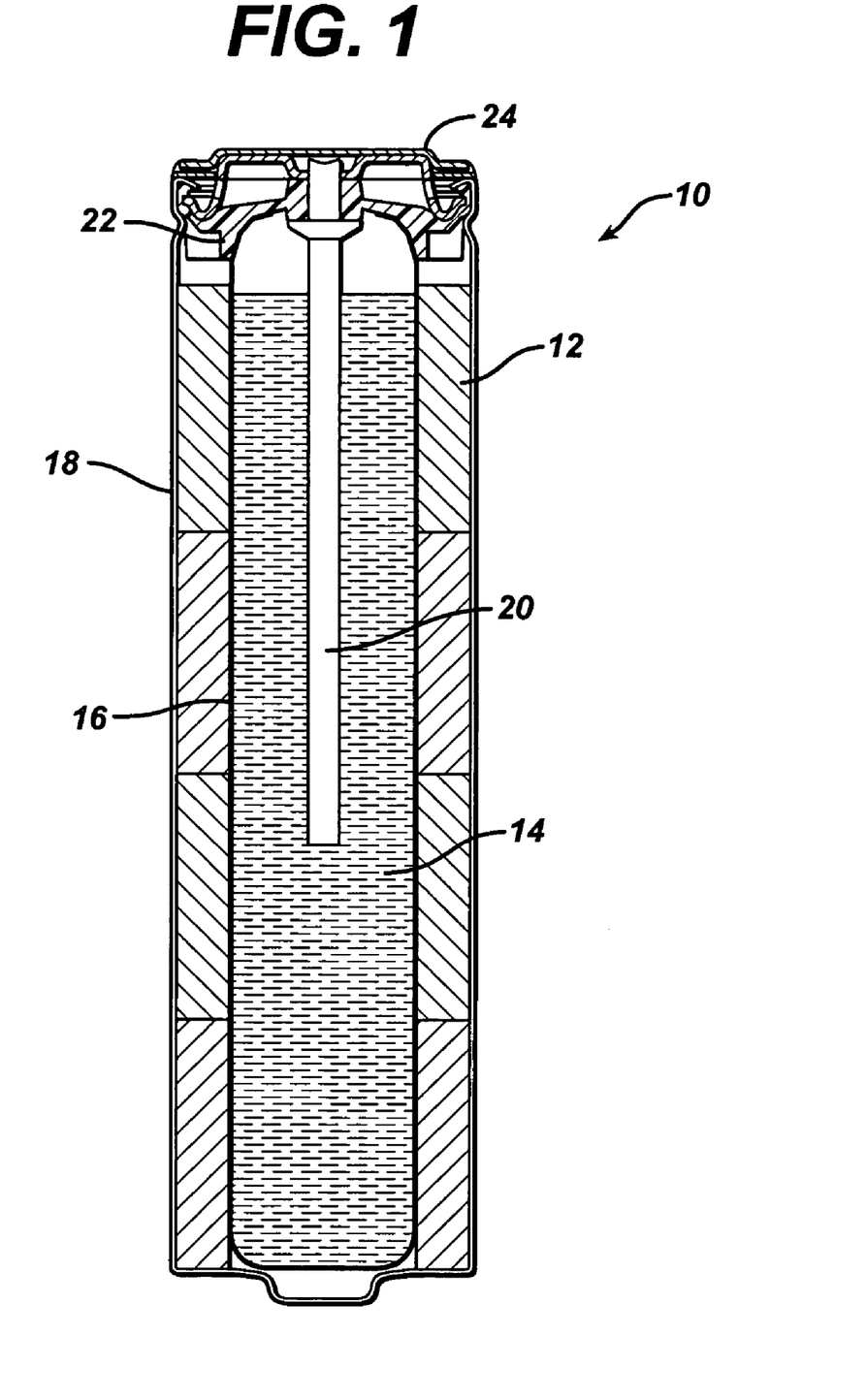
FIG. 1 is a side-sectional view of one embodiment of a battery.

Referring to FIG. 1, a battery 10 includes a cathode 12, an anode 14, a separator 16, and a cylindrical housing 18. Battery 10 also includes a current collector 20, a seal 22, and a negative metal top cap 24, which serves as the negative terminal for the battery. Cathode 12 is in contact with housing 18, and the positive terminal of battery 10 is at the opposite end of the battery from the negative terminal. An alkaline electrolyte is dispersed throughout battery 10. Battery 10 can be, for example, an AA, AAA, C, or D battery.

Anode 14 includes zinc metal particles. At least about 30% by weight of the zinc particles in the anode (e.g., at least about 40%, at least about 50%, at least about 60%, at least about 70%, at least about 80%, at least about 90%, or at least about 95% by weight of the zinc particles in the anode) are spherical. Spherical as used herein means that the zinc particles have an aspect ratio of between about 1.0 and about 2.0 or between about 1.0 and about 1.5 (e.g., between about 1.0 and about 1.25). The aspect ratio of the zinc particles can be determined by two methods. According to the first method, the aspect ratio of a zinc particle is equal to the reciprocal of its elongation ratio (i.e., 1/(elongation ratio)), where the elongation ratio is the smallest of the ratios between a measured diameter of the zinc particle and its perpendicular diameter. According to the second method, the aspect ratio of a zinc particle is equal to the ratio of the longest axis of the zinc particle to the mean perpendicular bisector of the longest axis. This measurement can be made using a two-dimensional image of the zinc particle.

The spherical zinc particles preferably have a mean particle size between about 100 μm and about 300 μm (measured by Sympatec Low Angle Laser analysis) and a between about 1.4 and about 1.8. The spherical zinc particles preferably have an average surface area of between about 50 $cm^2$/gram and about 250 $cm^2$/gram, e.g., between about 100 $cm^2$/gram and about 150 $cm^2$/gram (measured by B.E.T. analysis).

The spherical zinc particles may be alloys of zinc and, for example, aluminum, bismuth, calcium, gallium, indium, lithium, magnesium, lead, tin, or combinations thereof.

Anode 14 can be, for example, a zinc gel that includes the zinc metal particles, a gelling agent or gelling agents, and minor amounts of additives, such as gassing inhibitor. In addition, a portion of the electrolyte solution is dispersed throughout the anode.

Examples of gelling agents include polyacrylic acids, polyacrylonitrile, grafted starch materials (e.g., starch grafted polyacrylic acid, starch grafted polyacrylonitrile), salts of polyacrylic acids, polyacrylates, carboxymethylcellulose, sodium carboxymethylcellulose, or combinations thereof. Examples of such polyacrylic acids are Carbopol 940 and 934 (available from B.F. Goodrich) and Polygel 4P (available from 3 V), and an example of a grafted starch material is Waterlock A221 (available from Grain Processing Corporation, Muscatine, Iowa). An example of a salt of a polyacrylic acid is Alcosorb G1 (available from Ciba Specialties). The anode may include, for example, from about 0.1% by weight to about 2% by weight gelling agent.

Gassing inhibitors can be inorganic materials, such as bismuth, tin, lead and indium. Alternatively, gassing inhibitors can be organic compounds, such as phosphate esters, ionic surfactants or nonionic surfactants. Examples of ionic surfactants are disclosed in, for example, U.S. Pat. No. 4,777,100, which is hereby incorporated by reference.

Cathode 12 includes manganese dioxide, carbon particles, and a binder. The electrolyte solution also is dispersed through cathode 12. The weight percentages provided above and below are determined after the electrolyte solution has been dispersed.

The manganese dioxide can be electrolytically-synthesized $MnO_2$ (EMD), or chemically-synthesized $MnO_2$ (CMD), or a blend of EMD and CMD. Distributors of manganese dioxides include Kerr McGee, Co. (Trona D), Chem Metals, Co., Tosoh, Delta Manganese, Mitsui Chemicals and JMC.

The carbon particles can be any of the conventional carbon particles used in cathodes. The carbon particles can be, for example, graphite particles. The graphite can be synthetic or non-synthetic, or a blend of synthetic and non-synthetic. Suitable graphite particles can be obtained from, for example, Brazilian Nacional de Grafite (Itapecerica, MG Brazil (MP-0702X)) or Chuetsu Graphite Works, Ltd. (Chuetsu grades WH-20A and WH-20AF) of Japan. The cathode may include for example, between about 3% and about 7%, e.g., between about 4% and about 6.5%, carbon particles by weight.

Examples of binders include polyethylene powders, polyacrylamides, Portland cement and fluorocarbon resins, such as PVDF and PTFE. An example of a polyethylene binder is sold under the trade name Coathylene HA-1681 (available from Hoechst). The cathode may include, for example, between about 0.1% and about 1% binder by weight.

Cathode 12 can include other additives. Examples of these additives are disclosed in U.S. Pat. No. 5,342,712, which is hereby incorporated by reference. Cathode 12 may include, for example, from about 0.2% by weight to about 2% by weight $TiO_2$.

Separator 16 can have any of the conventional designs for battery separators. In some embodiments, separator 16 can be formed of two layers of non-woven, non-membrane material with one layer being disposed along a surface of the other. To minimize the volume of separator 16 while providing an efficient battery, each layer of non-woven, non-membrane material can have a basis weight of about 54 grams per square meter, a thickness of about 5.4 mils when dry and a thickness of about 10 mils when wet. In these embodiments, the separator preferably does not include a layer of membrane material or a layer of adhesive between the non-woven, non-membrane layers. Generally, the layers can be substantially devoid of fillers, such as inorganic particles.

In other embodiments, separator 16 includes a layer of cellophane combined with a layer of non-woven material. The separator also includes an additional layer of non-woven material. The cellophane layer can be adjacent cathode 12 or anode 14. The non-woven material contains, for example, from about 78% by weight to about 82% by weight PVA and from about 18% by weight to about 22% by weight rayon with a trace of surfactant. Such non-woven materials are available from PDM under the tradename PA25.

In some embodiments, separator 16 is a non-woven material (e.g., PA25, available from PDM) with a cellophane layer (e.g., 300P002, available from UCB) laminated on it.

The electrolytic solution dispersed throughout battery 10 can be any of the conventional electrolytic solutions used in batteries. The electrolyte can be an aqueous solution of KOH or NaOH. The electrolyte can include, for example, between about 20% by weight and about 50% by weight alkali hydroxide dissolved in $H_2O$. The electrolyte can contain between about 0% by weight and about 4% by weight zinc oxide.

Housing 18 can be any conventional housing used in primary alkaline batteries. The housing typically includes an inner metal wall and an outer electrically nonconductive material such as heat shrinkable plastic. Optionally, a layer of conductive material can be disposed between the inner wall and the cathode 12. This layer may be disposed along the inner surface of wall, along the outer circumference of cathode 12 or both. This conductive layer can be formed, for example, of a carbonaceous material. Such materials include LB 1000 (available from Timcal), Eccocoat 257 (available from W. R. Grace & Co.), Electrodag 109 (available from Acheson Industries, Inc.), Electrodag 112 (available from Acheson) and EB0005 (available from Acheson). Methods of applying the conductive layer are disclosed in, for example, Canadian Patent No. 1,263,697, which is hereby incorporated by reference.

Current collector 20 is made from a suitable metal, such as brass. Seal 22 can be made, for example, of nylon.

Figure 2:
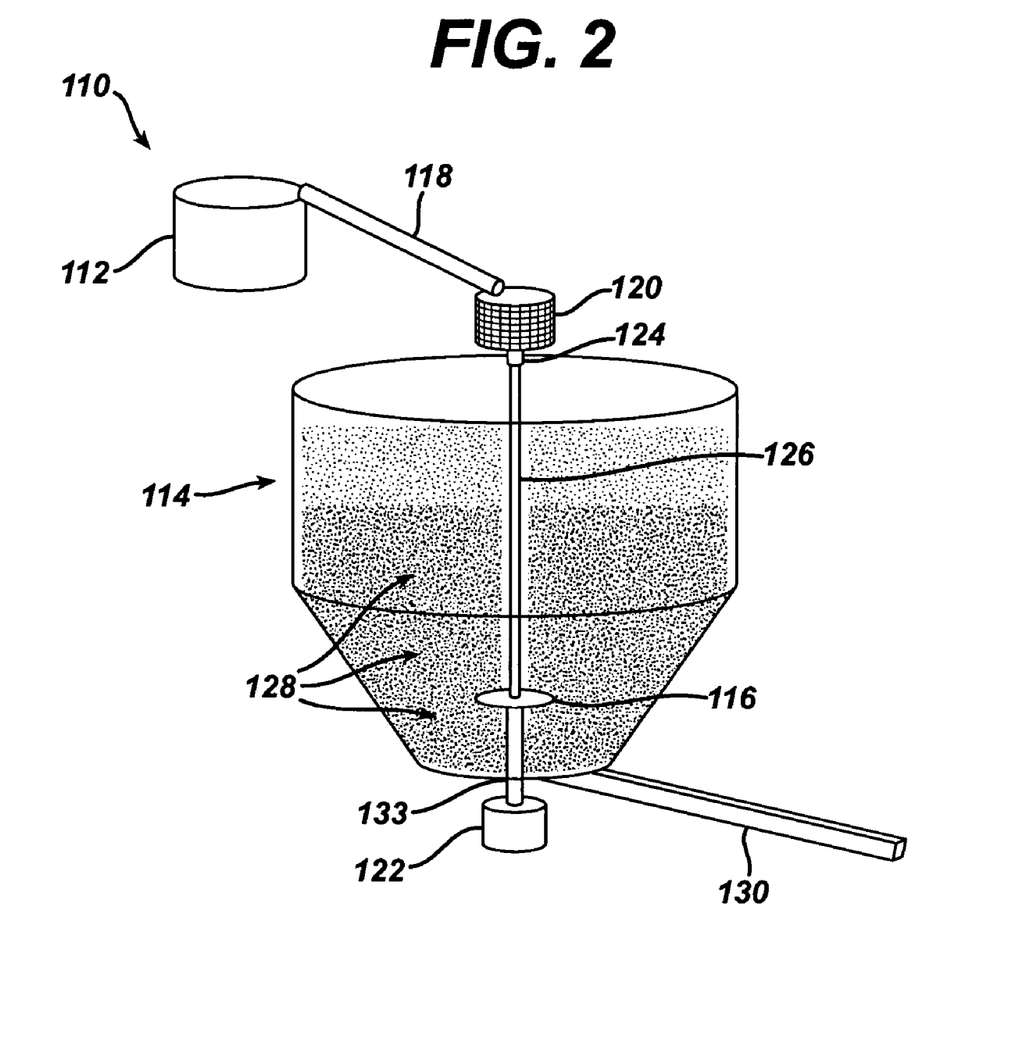
FIG. 2 is a schematic of a centrifugal atomization apparatus.

Referring to FIG. 2, the spherical zinc particles can be produced by centrifugal atomization. In FIG. 2, a centrifugal atomization apparatus 110 includes a furnace 112 and an atomization chamber 114. The atomization chamber is maintained in a low oxygen atmosphere (e.g., between about 0.001% and about 1.0% oxygen, more preferably less than about 0.5% oxygen). The balance of the gas in chamber 114 is inert gas (e.g., argon, helium, nitrogen). For example, the chamber may contain between about 0.01% and about 0.50% oxygen, with the balance of the gas being nitrogen.

A cup 116 is disposed within atomization chamber 114. Cup 116 can be made of, e.g., graphite, and can have a diameter between about 5 cm and about 50 cm, e.g., between about 10 cm and about 20 cm. Cup 116 can have a depth between about 0.1 cm and about 10 cm, e.g., between about 2 cm and about 3 cm. A motor 122 (e.g., a 7.5 hp motor) is connected to a shaft 133, which is further connected to cup 116.

A launder 118 connects furnace 112 to a tundish 120, which is located above atomization chamber 114.

Although not shown, centrifugal atomization apparatus 110 can include other components, such as a pulley system disposed between motor 122 and cup 116.

In operation, motor 122 drives cup 116, causing the cup to rotate. The cup can rotate at a rotational velocity of between about 500 rpm and about 50,000 rpm (e.g., between about 6000 rpm and about 8500 rpm).

Zinc and alloying components are fed into furnace 112, in which the zinc and alloying components are then melted. The molten alloy can include about 1 ppm to about 5,000 ppm (based on molten metal mass) of the alloying components (e.g., aluminum, bismuth, calcium, gallium, indium, lithium, magnesium, lead, tin, or combinations thereof). The alloying components can be bismuth, indium, and lead in the range of about 100 ppm to about 500 ppm. The alloying components can be bismuth and indium in the range of between about 100 ppm and about 500 ppm.

Once a sufficient amount of the resulting molten alloy has collected in furnace, the molten alloy travels down launder 118 and into tundish 120. Tundish 120 has an orifice 124. When the molten alloy travels through orifice 124, it forms a stream 126, which eventually makes contact with cup 116. Orifice 124 can be sized to allow for the desired melt flow rate (i.e., the flow rate of stream 126). The molten metal has a melt flow rate of between about 10 pounds of zinc per hour and about 20,000 pounds of zinc per hour (e.g., between about 4,000 pounds of zinc per hour and about 7,000 pounds of zinc per hour; about 2,450 pounds of zinc per hour; about 3,100 pounds of zinc per hour).

When stream 126 contacts cup 116, centrifugal force causes the molten alloy to spread out across cup 116 and then break free of the cup in droplets which subsequently cool and solidify, forming zinc particles 128. A percentage of the resulting zinc particles can be spherical. Once zinc particles 128 have been formed, they can, for example, be transported to a sieving operation (e.g., including a 60 mesh screen) by a transport means 130.

EXAMPLE

An example of an anode slurry including spherical zinc particles can be prepared according to the following procedures. (While the preparation of zinc particles is executed on a production scale, the preparation of the electrolyte gel and the preparation of the anode slurry are executed on a lab and/or pilot scale, and would need to be scaled up for production.) The anode slurry can be incorporated into, for example, the battery in FIG. 1.

Preparation of Zinc Particles

Zinc particles with the following characteristics can be prepared by centrifugal atomization, as described with reference to FIG. 2 above:

TABLE 1

Characteristics of Zinc Particles

|  | Zinc Particles |
| --- | --- |
| Particle Size Diameter @ d10 | 86.2 μm |
| Particle Size Diameter @ d50 | 154 μm |
| Particle Size Diameter @ d90 | 305 μm |
| BET Surface Area | 128 cm²/gram |

The zinc powder can be made with a centrifugal atomization apparatus, using a relatively constant oxygen content and rotational velocity of 0.35% and 7750 rpm, respectively. A melt flow rate of about 3100 pounds/hour or about 2450 pounds/hour can be used. The atomizing cup can be approximately 6 inches in diameter.

Preparation of Electrolyte Gel

An electrolyte gel with the following contents can be prepared:

TABLE 2

Contents of Electrolyte Gel

| Component | Percentage |
| --- | --- |
| Electrolyte | 97.9% |
| C940 | 1.60% |
| Waterlock A221 | 0.50% |

An electrolyte gel can be made as follows:
1. Put an electrolyte of 34.8% KOH and 2.0% ZnO in water in a blender and turn the blender on.
2. Gradually add C940 (available from Noveon, Inc.) and Waterlock A221 (available from Grain Processing Corp.) gelling agents to the blender.
3. Turn the blender off after about 3 minutes.
4. Allow the resulting gel to hydrate for at least 8 hours (preferably 24 hours).

Preparation of Anode Slurry

An anode slurry with the following composition can be prepared.

TABLE 3

Contents of Anode Slurry

| Component | Amount |
| --- | --- |
| electrolyte gel | 39.9% |
| spherical zinc (−60 mesh) | 60.0% |
| indium acetate (approximately 41% In) | 0.0286% (196 ppm based on Zn mass) |
| surfactent (RM510) (approximately 4.0% in H₂O) | 0.0750% (50 ppm based on Zn mass) |

The anode slurry can be prepared according to the following procedure:
1. Add gelled electrolyte to a 1.5 liter capacity double planetary blender.
2. Add indium acetate and surfactant solution.
3. Raise≈28" (Hg) vacuum (i.e., about 50 mm absolute pressure), turn on agitator (20 rpm), and blend for 6 minutes.
4. Shut off agitator and release vacuum.
5. Turn on agitator and add zinc powder over the course of 15-30 seconds.
6. Raise≈28" (Hg) vacuum, turn on agitator (20 rpm), and blend for 24 minutes.

The spherical zinc particles also can be used in the anode of a prismatic cell. Suitable prismatic cells are described in U.S. Ser. No. 10/336,475 and in U.S. Ser. No. 10/336,261, both filed Jan. 3, 2003, the entire contents of which are incorporated by reference herein.

Figure 3:
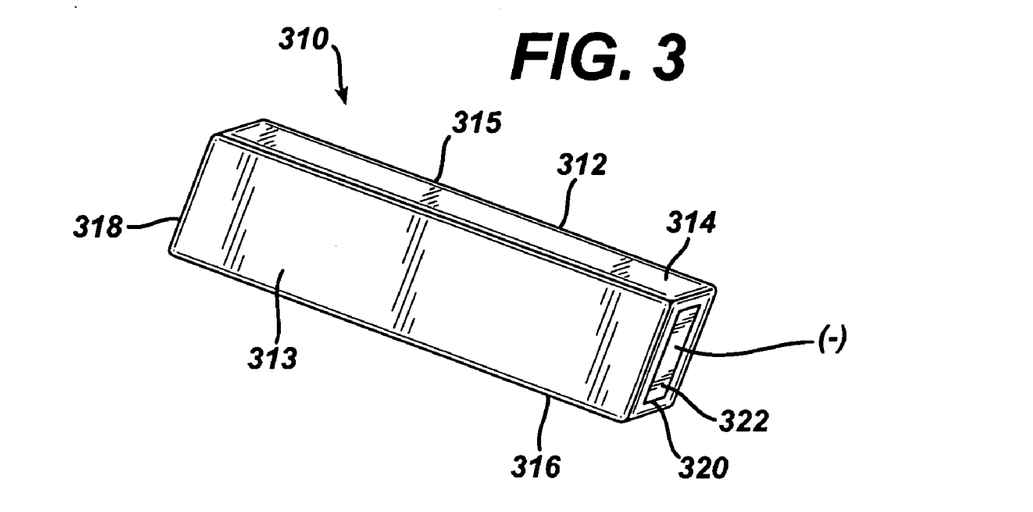
FIGS. 3 and 3A are perspective views of another embodiment of a battery.
Figure 3A:
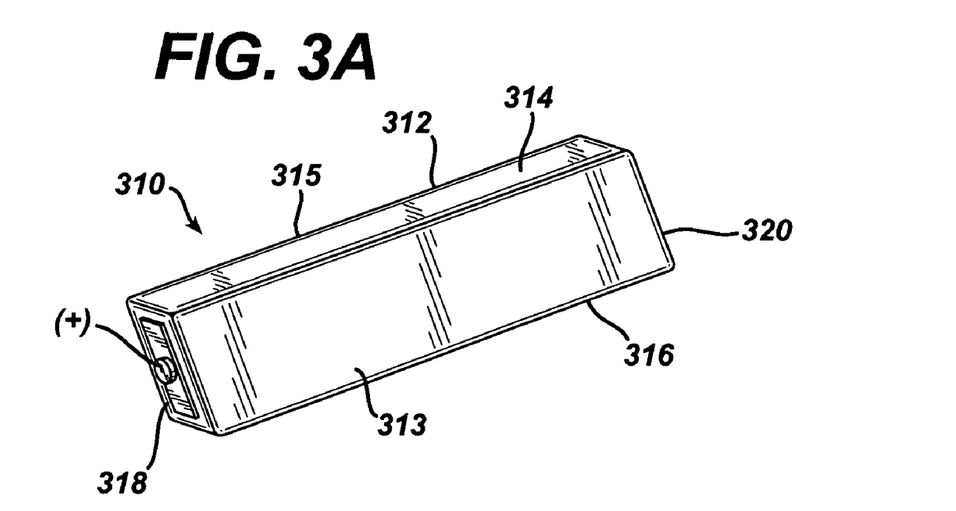
Figure 3B:
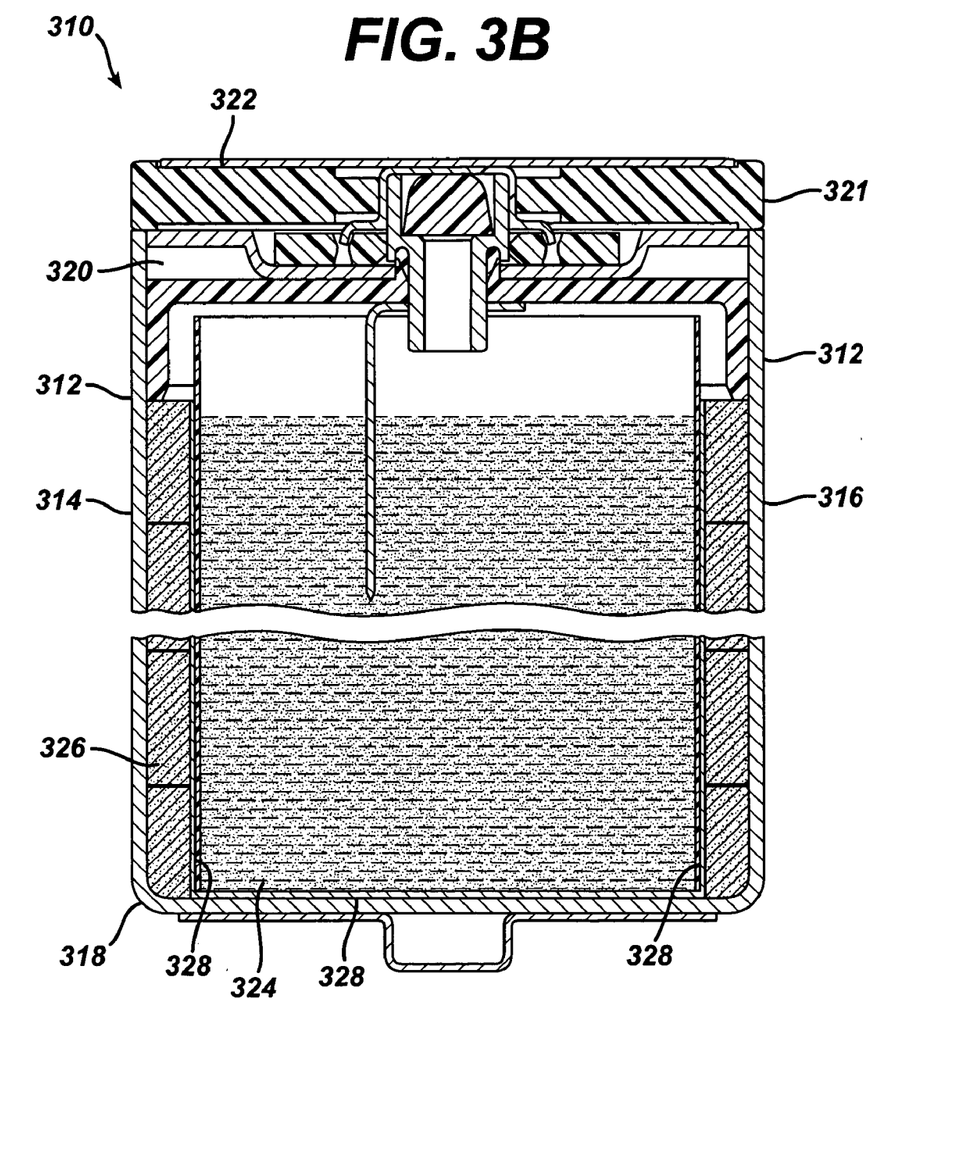
FIG. 3B is a cross-sectional view of the battery of FIGS. 3 and 3A.

Referring to FIGS. 3-3B, a prismatic cell 310 has at least two flat opposing sides which are parallel to the cell's longitudinal axis. Cell 310 can be a parallelepiped, and is preferably of rectangular shape. Cell 310 has a housing 312 that is bounded by a pair of opposing large flat walls 313 and 315, a pair of opposing small flat walls 314 and 316, a closed end 318, and an opposing open end 320. The cell further includes an end cap assembly 321 with a negative terminal plate 322. Cell contents include an anode 324, a cathode 326, and a separator 328. Anode 324 is in the form of a zinc slurry including spherical zinc particles and an aqueous electrolyte.

Other embodiments are within the scope of the following claims.

What is claimed is:

1. A method of making zinc particles comprising centrifugally atomizing molten zinc in an atmosphere of less than about 1% oxygen to provide the zinc particles, wherein at least about 30% by weight of the zinc particles are spherical, each spherical zinc particle having an aspect ratio of between about 1.0 and about 2.0, wherein the aspect ratio is equal to the ratio of the longest axis of the zinc particle to the mean perpendicular bisector of the longest axis, the centrifugal atomization comprising contacting the molten zinc with a spinning cup that breaks the molten zinc into droplets that after cooling provide the zinc particles.

2. The method of claim 1, wherein the molten zinc is centrifugally atomized in an atmosphere of less than about 0.7% oxygen.

3. The method of claim 2, wherein the molten zinc is centrifugally atomized in an atmosphere of less than about 0.5% oxygen.

4. The method of claim 3, wherein the molten zinc is centrifugally atomized in an atmosphere of less than about 0.3% oxygen.

5. The method of claim 4, wherein the molten zinc is centrifugally atomized in an atmosphere of less than about 0.1% oxygen.

6. The method of claim 1, further comprising incorporating the zinc particles into an anode.

7. A method of making a battery comprising:
   (a) centrifugally atomizing molten zinc in an atmosphere of less than about 1% oxygen, wherein the centrifugal atomization comprises contacting the molten zinc with a spinning cup that breaks the molten zinc droplets that after cooling provide zinc particles, and wherein at least about 30% by weight of the zinc particles are spherical, each spherical zinc particle having an aspect ratio of between about 1.0 and about 2.0, wherein the aspect ratio is equal to the ratio of the longest axis of the zinc particle to the mean perpendicular bisector of the longest axis;
   (b) incorporating the zinc particles into an anode; and
   (c) incorporating the anode and a cathode into a cell housing.

8. The method of claim 7, wherein at least about 60% by weight of the zinc particles are spherical.

9. The method of claim 7, wherein at least about 70% by weight of the zinc particles are spherical.

10. The method of claim 7, wherein at least about 80% by weight of the zinc particles are spherical.

11. The method of claim 7, wherein at least about 90% by weight of the zinc particles are spherical.

12. The method of claim 7, wherein at least about 95% by weight of the zinc particles are spherical.

13. The anode of claim 1, wherein at least about 60% by weight of the zinc particles are spherical.

14. The anode of claim 1, wherein at least about 70% by weight of the zinc particles are spherical.

15. The anode of claim 1, wherein at least about 80% by weight of the zinc particles are spherical.

16. The anode of claim 1, wherein at least about 90% by weight of the zinc particles are spherical.

17. The anode of claim 1, wherein at least about 95% by weight of the zinc particles are spherical.

* * * * *